(12) United States Patent
Tsang

(10) Patent No.: US 8,175,398 B2
(45) Date of Patent: May 8, 2012

(54) METHOD FOR ENCODING A PLURALITY OF VIDEO SIGNALS INTO A SINGLE VIDEO SIGNAL

(75) Inventor: Peter Wai Ming Tsang, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 793 days.

(21) Appl. No.: 12/267,719

(22) Filed: Nov. 10, 2008

(65) Prior Publication Data

US 2010/0119175 A1 May 13, 2010

(51) Int. Cl.
*G06K 9/36* (2006.01)
(52) U.S. Cl. ........................ 382/232; 382/235
(58) Field of Classification Search .................. 382/232, 382/235, 100, 294, 276; 348/E5.006, E5.002; 345/473; 709/249; 370/397; 380/252; 375/E7.086
See application file for complete search history.

(56) References Cited

U.S. PATENT DOCUMENTS

| 5,119,442 | A | * | 6/1992 | Brown ........................... 382/235 |
| 5,544,161 | A | * | 8/1996 | Bigham et al. ................. 370/397 |
| 2002/0011969 | A1 | | 1/2002 | Lipton et al. |
| 2002/0036825 | A1 | | 3/2002 | Lipton et al. |
| 2007/0109401 | A1 | | 5/2007 | Lipton et al. |
| 2007/0182738 | A1 | | 8/2007 | Feldman et al. |

FOREIGN PATENT DOCUMENTS

WO  WO 2007/059054 A2  5/2007

OTHER PUBLICATIONS

Lau, R.; "Compression of still multiview images for 3-D automultiscopic spatially-multiplexed displays", IS&T/SPIE Sym. Elec. Img., Stereo. Disp. & App., (2007).

* cited by examiner

*Primary Examiner* — Anh Hong Do
(74) *Attorney, Agent, or Firm* — Leydig, Voit & Mayer, Ltd.

(57) ABSTRACT

A method of encoding video signals into a single video signal includes extracting background images from corresponding video signals, encoding the video signals into a single video signal, the single video signal containing information for reconstructing the video signals, and replacing frames of the single video signal with the background images.

16 Claims, 4 Drawing Sheets

METHOD FOR ENCODING A PLURALITY OF VIDEO SIGNALS INTO A SINGLE VIDEO SIGNAL

BACKGROUND TO THE INVENTION

1. Field of the Invention

The current invention relates to a method for encoding a plurality of video signals into a single video signal, and in particular for encoding a plurality of video signals each representing a different view of the same scene into a single video signal.

2. Background Information

Three Dimensional (3D) autostereoscopic display apparatus allow multi-view 3D images to be observed without the need of wearing polarized or colored spectacles. Examples of autostereoscopic displays can be found in PCT patent publication WO 2007/059054 and US patent publications 2002/0011969, 2002/0036825 and 2007/0182738, the entire contents of which are incorporated herein by reference.

In order to integrate multi-view 3D video signals into existing video chains, the N-tiles format has been proposed and adopted in the autostereoscopic display systems mentioned above. In the N-tiles format each frame of video comprises N pictures of identical resolution, one from each channel. To be compatible with existing 2D video chains the N pictures are each compressed by downsampling so that all N pictures can fit into an equivalent 2D frame. The N-tile format is illustrated in FIG. 1. A plurality, in the illustrated case nine, video signals are generated by nine video cameras 1-9 each directed at a different view of the same scene 10. Each of the nine video signals, or channels, is downsampled by an N-tiles processor 11 and integrated into a single picture frame 12 by evenly distributing them in a 3×3 tile structure. In the illustrated embodiment with nine channels each signal is downsampled by three times along the horizontal and vertical directions so that its area is reduced by ⅑ of its original value. With this approach the multiple channels of video sequence will be encoded to an ordinary two dimensional video sequence enabling multi-view 3D images to be processed in identical ways as ordinary two dimensional (2D) video signal, and fit into existing video chains. At the receiving end the aggregated signals will be decoded back to the multiple video sequences, and display on the Autostereoscopic monitor through a process known as "Interdigitation". However, the resolution of each view is degraded significantly and is not in line with the current HDTV trend.

Because of the downsampling in each channel picture quality is heavily degraded in resolution. This leads to a general blurring of the pictures when they are displayed on the autostereoscopic monitors and artifacts become even more prominent in stationary or slowly varying scenes where viewers have sufficient time to study the details. Although interpolation techniques can be applied to attain a more pleasing visual quality the computational loading is heavily increased and detail information that is lost in the downsampling process is not recovered.

SUMMARY OF THE INVENTION

The objective of the current invention is provide a method for encoding a plurality of video signals, and, in particular, a plurality of video signals, each video signal representing a different view or part of the same scene, into a single video signal. This allows the aggregated signals to be compatible with existing video chains and equipment.

In simple terms the present invention brings the High Definition element back into perspective in N-tile format. Multiple channels of video signals each corresponding to a unique view or part of a scene, encoded into a single video sequence, can be distributed, compressed, and recorded in the same way as ordinary 2D video signals. The invention differs from the N-tiles format in that the full resolution of contents that are either stationary or varying slowing over a finite period of time is preserved. The remaining contents which contain heavier motion components are represented with identical resolution as the N-tiles format. The rationale is that stationary or slow changing scenes allow plenty of time for viewers to examine every minor detail carefully and should be presented in higher definition, whereas artifacts in rapidly moving areas of the scenes are generally more forgiving in human perception. Experimental results reveal significant improvement in the visual quality of multi-view images represented with the format of the current invention as compared with the N-tile format.

Further aspects of the invention will become apparent from the following description.

BRIEF DESCRIPTION OF THE DRAWINGS

An exemplary form of the present invention will now be described by way of example only and with reference to the accompanying drawings, in which.

DESCRIPTION OF THE EXEMPLARY EMBODIMENTS

Figure 1:
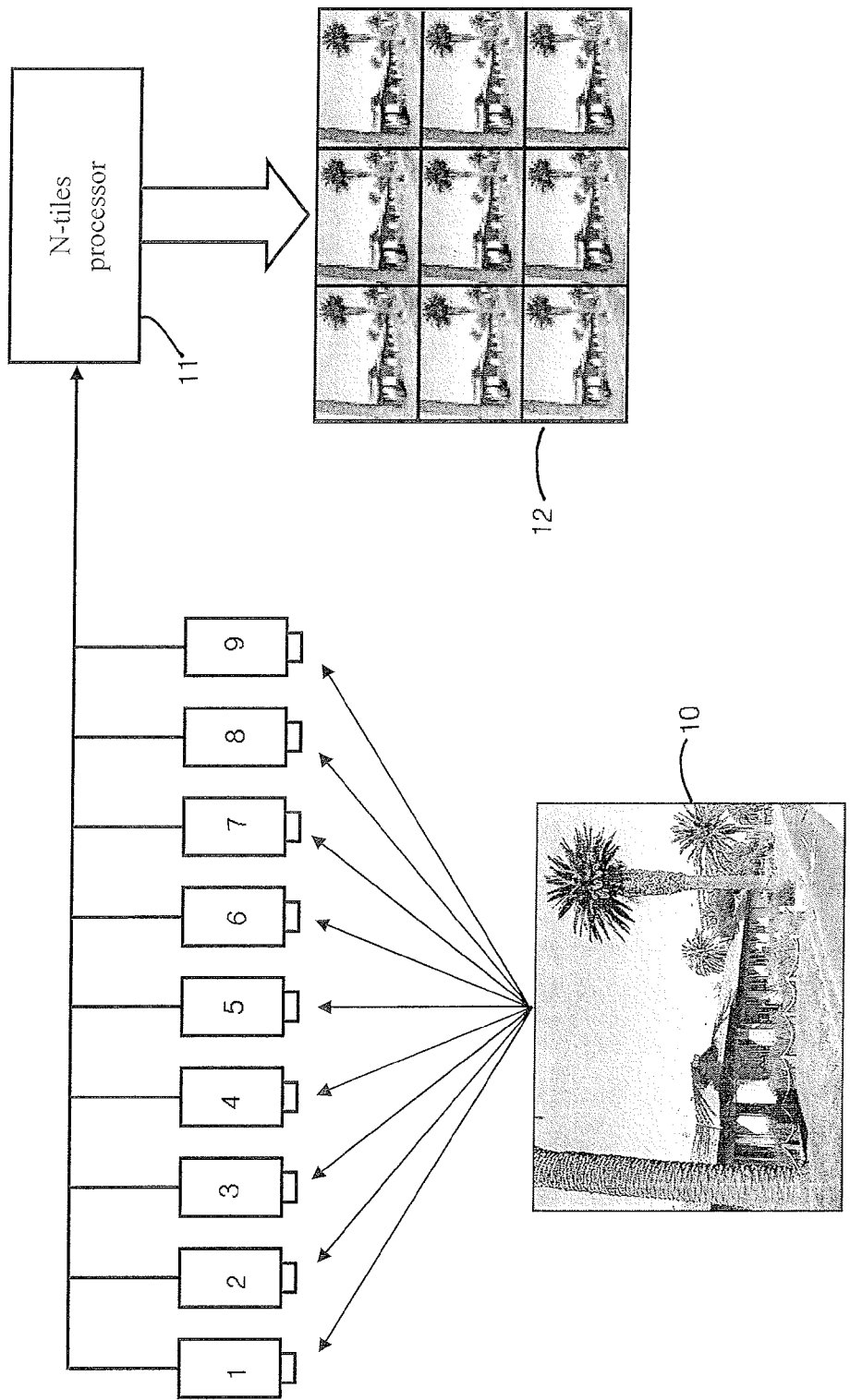
FIG. 1 is a schematic illustration of the prior art N-tiles encoding format.
Figure 2:
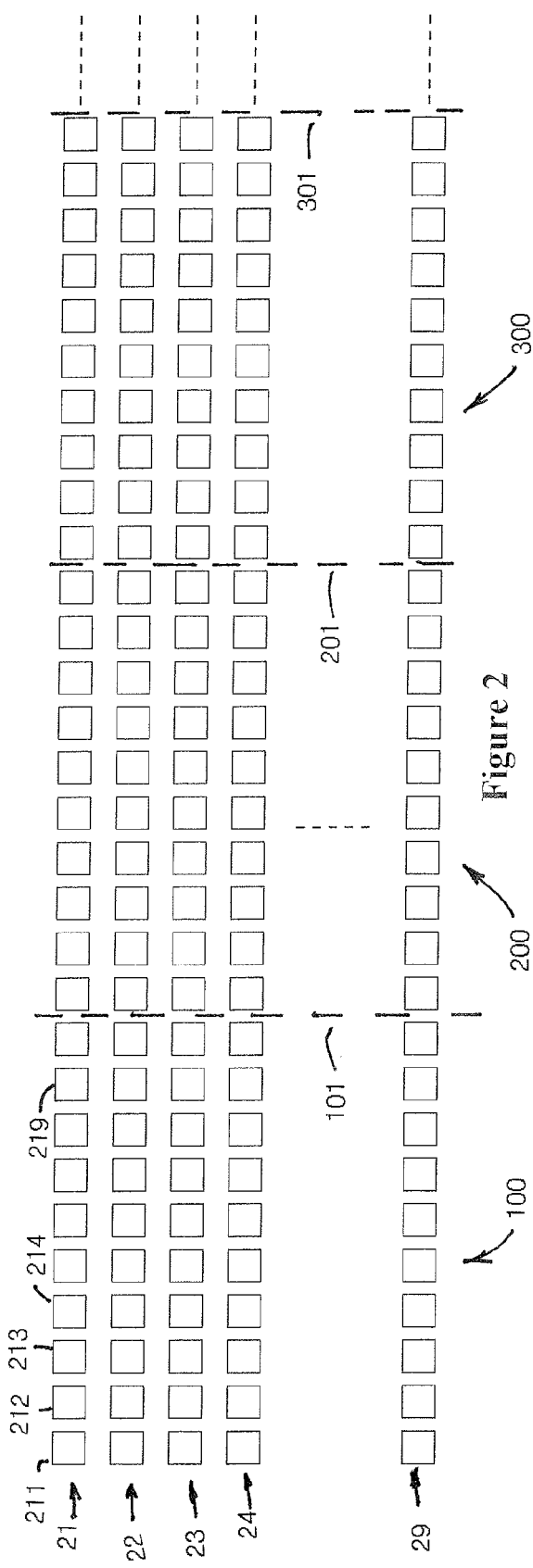
FIG. 2 is a schematic illustration of a plurality of video signals, each signal representing a different view or part of the same scene, each video signal being represented in the illustration by a plurality of sequential frames.

FIG. 1 schematically illustrates a plurality of video signals 21, 22, 23, 24 . . . 29 each of which might be captured using the nine cameras 1-9 represented in FIG. 1. Of course, nine such video signals would be present but for illustrative purposes only the first four signals 21, 22, 23, 24 and last signal 29 are shown in FIG. 2. For the purpose of illustrating the invention, each video signal 21-24 . . . 29 is represented by a plurality of sequential video frames. For clarity only the first four frames 211, 212, 213, 214 and ninth frame 219 of the first video sequence 21 are provided with reference numerals.

In the method of the invention each of the plurality of video signals 21-29 is separated into a plurality of corresponding short non-overlapping video subsequences of x video frames. The number of frames x in each subsequence is not critical to the invention and may comprise just a few seconds of video. The corresponding subsequences from each of the multiple-view video signals is called a group of subsequences (GoS). For illustrative purposes each GoS 100, 200, 300 is separated by dashed lines 101, 201, 301. A GoS comprises multiple corresponding subsequences, each subsequence comprising a different video signals 21-29 of the same scene. There are 10 frames in each subsequence in each GoS 100, 200, 300 illustrated in FIG. 2, but this is not critical to the invention. The multiple corresponding subsequences in each GoS 100, 200, 300 are integrated into a single video subsequence using one of two integration methods, which is dynamically chosen based on the characteristics of the scene in each GoS. The resulting plurality of contiguous single video subsequences representing each GoS subsequence is then recombined into a full single video sequence containing information of the original multiple-view video signals.

The method of integrating the multiple subsequences in each GoS into a single subsequence is based on the type of scene represented by each GoS. If the scene represented by the GoS has significant background components then the multiple subsequences of the GoS, hereafter termed a type-1 GoS, are integrated using a first method. If the are no significant background components in the scene, then the multiple subsequences of the GoS, hereafter termed a type-2 GoS, are integrated using a second method. The background of a scene comprises stationary or slowly varying contents. The background of each subsequence is its low frequency components, which can be obtained by applying an edge-preserved low pass filter (EPF) to each of the multiple subsequences. The foreground, of high frequency component, of each subsequence can be obtained by removing the background from the original input image. The threshold of the EPF is the trigger for whether a GoS is type-1 or type-2.

Figure 3:
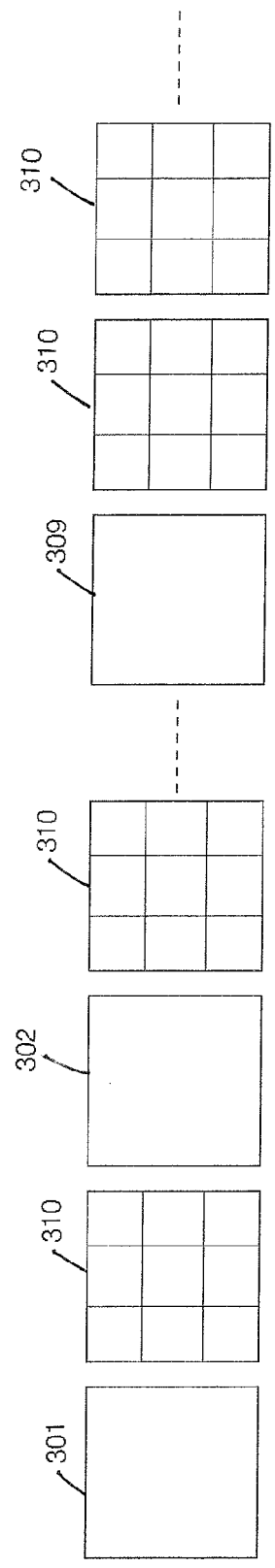
FIG. 3 is a schematic illustration of a plurality of sequential video frames in a single video signal encoded using a first embodiment of the present invention.

In the integration of a type-1 GoS, the background image of each multiple subsequence is first extracted at full resolution using an EPF. The background image in each frame of the multiple subsequences is the same so that if there are N subsequences on the GoS then N background images will be obtained. In the embodiment illustrated there are nine subsequences in each GoS 100, 200, 300 and so there will be nine background images. Next at each frame instance of each of the multiple sequence, a foreground image is obtained by subtracting the corresponding background image from the frame. The N foreground images in each frame instance are then integrated into a single image using the N-tiles format of the prior art, resulting in a single subsequence of N-tile format foreground frames. The N background images are interlaced with the N-tiles foreground frames to form the output subsequence. In order to maintain an identical number of frames between the input GoS and output GoS, N foreground frames are replaced by the N background images. The foreground frames to be replaced may be determined by any logically repeatable sequence, such as replacing the first N odd or even frames of foreground images with the background images. So, for example, a GoS 100 comprises nine subsequence (i.e., N=9) and the subsequence length is 100 frames the first nine odd frames (i.e., frames 1, 3, 5, 7, 9, 11, 13, 15, 17) are replaced with the nine background images. This is illustrated in FIG. 3 wherein the first, second and ninth background images are labeled 301, 302, and 309, respectively and the N-tile encoded foreground frames are labeled 310.

For the Class-2 GoS, which has no significant background component, the N images in each frame instance are encoded into a single N-tiles format as known in the art. The output is a sequence of N-tiles pictures.

In the final integrated video signal, the start and end of each GoS subsequence is indicated by a flag 401, 402 in the first and last frames of the subsequence. In the preferred embodiment a suitable flag method is facilitated by blanking the first and last video line in every frame of every subsequence. Flags are then inserted into the blanked video lines. To indicate a type-1 GoS subsequence in the final integrated video, the first video line in the first and last frames in the subsequence are set to peak white. To indicate a type-2 GoS subsequence in the final integrated video, the last video line in the first and last frames in the subsequence are set to peak white.

Figure 4:
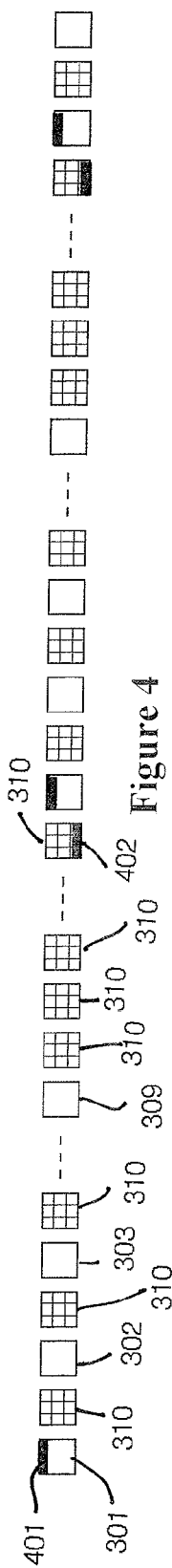
FIG. 4 is a second schematic illustration of a plurality of sequential video frames in a single video signal encoded using the first embodiment of the present invention.

FIG. 4 schematically illustrates the final single video sequence which includes information from the plurality of original video signals representing different views, or parts, of the same scene. The signal of FIG. 4 is represented by individual video frames in which flags 401 and 402 represent the beginning and end frames of an encoded GoS. Full resolution background frames 301, 302, 303 ... 309 are interlaced with N-tiles encoded frames 310 at the beginning of the some sequence.

At the receiving end, each GoS is decoded to reconstruct the multiple channel video subsequences. A type-2 GoS is decoded in the same way as a known N-tiles sequence. Each tile is interpolated to full resolution and interdigitized to one of the N views on the autostereoscopic monitor. For Type-1 GoS, the decoding process involves three stages. First, the N background pictures are extracted from the subsequence. Second, the N-tiles foreground sequence are decoded to multiple channel foreground video subsequences. Foreground images that have been replaced by the background pictures in the encoding process will be missing in the decoded GoS. Each of the missing pictures will be substituted by the previous neighboring foreground picture that has been previously decoded. Finally, each channel foreground picture is overlaid onto the corresponding background image of the same to reconstruct the original picture.

The advantage of the proposed method is that stationary or slowly varying contents of the multiple channel video sequence will be presented with full resolution on the autostereoscopic monitor. The fast varying contents are presented with resolution identical with those encoded with the N-tiles format.

The invention is further illustrated by the flowing example of steps in a method for encoding multiple video signals each comprising a different viewing angle of the same scene into a single video signal:

(1) Firstly, a plurality of video signals, or channels, each comprising a different viewing angle of the same scene are partitioned into a plurality of contiguous and non-overlapping shorter Groups of Subsequences (GoS).

(2) Secondly, each GoS is categorized into either a type-1 or a type-2 GoS.

A type-1 GoS is processed according to steps (3) to (7).

(3) A background image is extracted from each of the plurality of video signal subsequences in each type-1 GoS using any suitable background extraction method, for example a edge-preserve low pass filter. Each background image represents the stationary content common to all frames in its respective video signal subsequence.

(4) A foreground image is extract for each frame in each of the plurality of video signal subsequences. The foreground image can be found by any suitable means known in the art, for example by subtracting the respective background image from each original frame image.

(5) At each frame instance, the multiple foreground images (from each channel) are encoded with the N-tiles format into a single subsequence.

(6). The full resolution background images are interlaced with the N-tiles foreground subsequence by replacing known foreground frames with background images.

(7) The first and last video lines in each frame of the GoS sequence are blanked and the first video line in the first and last frames are set to peak white to identify a type-1 GoS.

A type-2 GoS is processed according to steps (8) and (9).

(8) The plurality of video signals, or channels, is encoded into a single subsequence using the N-tiles method.

(9) The first and last video lines in each frame of the subsequence are blanked and the last video line in the first and last frames are set to peak white to identify a type-2 GoS.

(10). The encoded type-1 and type-2 GoS subsequences are chained in order to provide a single video sequence of the scene that contains information from the original plurality of video signals comprising a different viewing angle of the same scene.

At the receiver or autostereoscopic display apparatus, the single video signal is decoded according to steps (11) and (17) into the plurality of video signals for displaying a 3D image of the scene.

(11) The single video sequence is split into a plurality of subsequence comprising the type-1 and type-2 GoS by identifying the peak white flags in the first and last lines of the video frames.

(12) Type-2 GoS are decoded into a plurality of corresponding subsequences using the N-tiles method. The frames are up-sampled to original size by interpolation.

Type-1 GoSs are decoded according to steps (13) to (17).

(13) The full resolution background images are extracted from their frame positions in the sequence.

(14) The missing frames, i.e., the frames deleted to make way for the background images, are replaced by interpolation from adjacent frames.

(15) The subsequence of frames representing foreground images of the video subsequence are decoded into a plurality of corresponding subsequences using the N-tiles method. Each frame is up-sampled to its original size by interpolation.

(16) At each frame in each of the plurality of corresponding subsequences the full frame image is reconstructed by adding the respective full resolution background image to the foreground image.

(17) Respective subsequences from each type-1 and type-2 GoS are chained in order to reconstruct the original plurality of video signals comprising a different viewing angle of the same scene.

Figure 7:
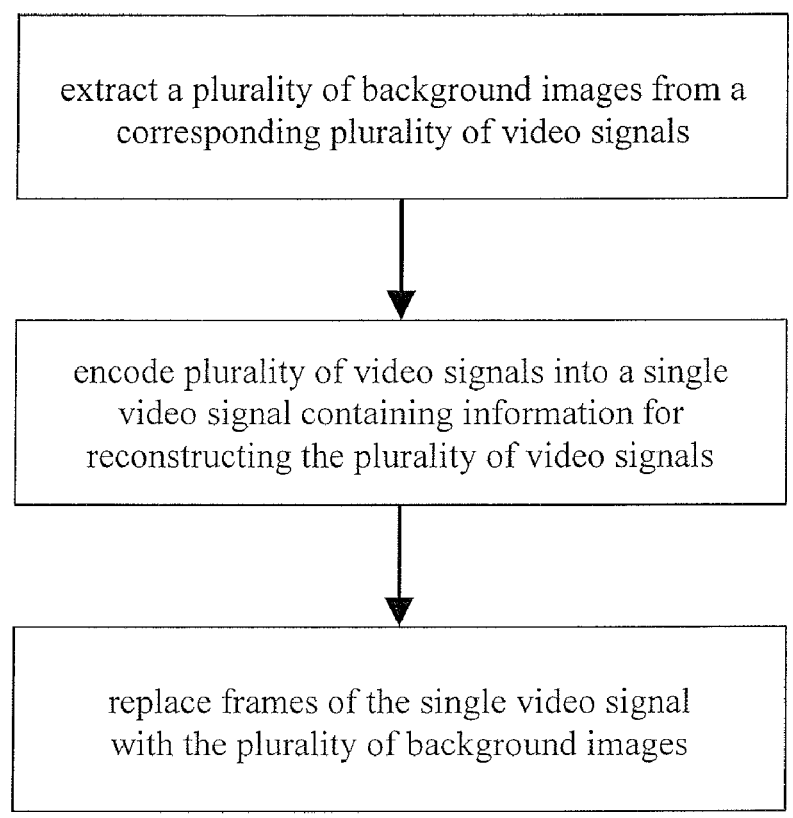
FIG 7 is a flow chart illustrating the method according to the invention.

In general terms, as shown in the flow chart of FIG. 7, the invention includes encoding a plurality of video signals into a single video singal by extracting a plurality of background images from a corresponding plurality of video signals. The plurality of video signals are encoded into a a single video signal containing information for reconstructing the plurality of video signals. Then, frames of the single video signal are replaced with the extracted background images.

Figure 5:
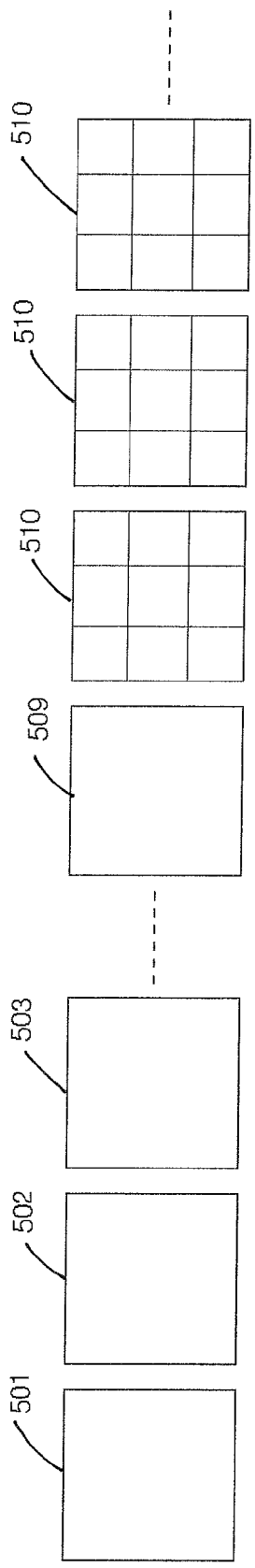
FIG. 5 is a schematic illustration of a plurality of sequential video frames in a single video signal encoded using a second preferred embodiment of the current invention.
Figure 6:
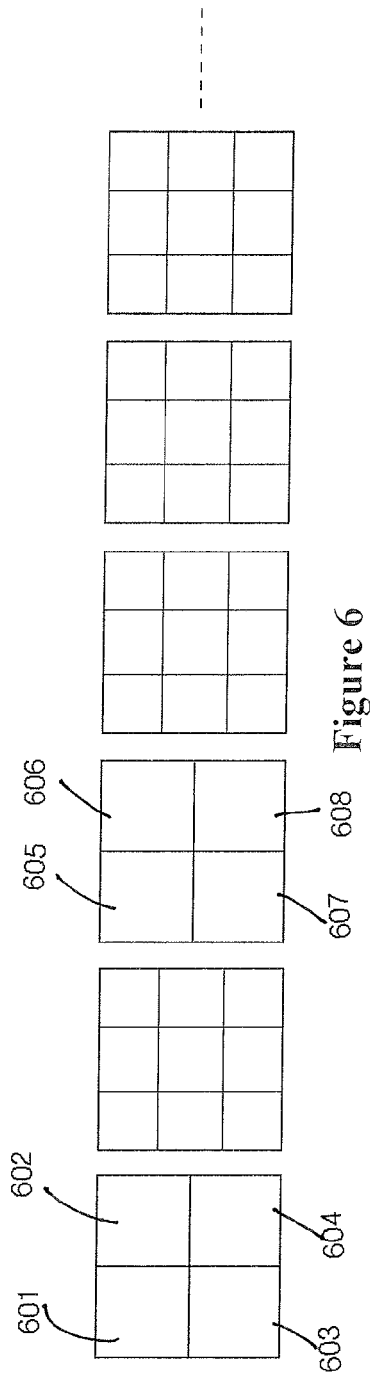
FIG. 6 is a schematic illustration of a plurality of sequential video frames in a single video signal encoded using a third embodiment to the present invention.

It should be appreciated that modifications and alterations obvious to those skilled in the art are not to be considered as beyond the scope of the present invention. For example, turning to FIGS. 5 and 6 different methods of interlacing background images into N-tiles encoded frames of the video sequence are shown. In FIG. 5, the background images 501, 502, 503 . . . 509 are placed in a sequence before the N-tiles encoded frames 510. FIG. 6 represents a further embodiment in which the background images 601, 602, 603, 604, 605, 606, 607, 608 are also encoded within the N-tiles format, but at a much higher resolution than the foreground images. With the N-tiles format known hitherto, corresponding frames of each of the plurality of video signals representing different views of the scene are tiled into a single frame of the output video sequence. According to the current invention multiple background images can be interlaced at different positions within the single output video. The result is that each frame of the output signal does not need to contain data from each of the plurality of original input signals. In the embodiment of FIG. 6, the background images 601, 602, 603, 604, 605, 606, 607, 608 are encoded by N-tiles format in higher resolution by taking up multiple frames which are then interlaced with the N-tile foreground images.

The invention claimed is:

1. A method for encoding a plurality of video signals into a single video signal comprising:
using a filter for extracting a plurality of background images from a corresponding plurality of video signals,
encoding the plurality of video signals into a single video signal, the single video signal containing information for reconstructing the plurality of video signals, and
replacing frames of the single video signal with the background images.

2. The method of claim 1 wherein the plurality of video signals represent different views or parts of a single scene.

3. The method of claim 1 wherein the extracting a plurality of background images from a corresponding plurality of video signals comprises separating the plurality of video signals into the plurality of background images and a corresponding plurality of foreground image sequences.

4. The method of claim 3 wherein the plurality of video signals comprises N video signals and including extracting N background images, one background image from each of the N video signals.

5. The method of claim 3 wherein the background images comprise low frequency components of the video signals.

6. The method of claim 3 wherein the foreground images comprise high frequency components of the video signals.

7. The method of claim 3 wherein encoding the plurality of video signals into a single video signal comprises, for each corresponding frame of the plurality of video signals, compressing corresponding foreground images of the plurality of video signals and tiling the foreground images compressed into a single frame image.

8. The method of claim 1 wherein encoding the plurality of video signals into a single video signal comprises, for each corresponding frame of the plurality of video signals, compressing corresponding frame images of the plurality of video signals and tiling the frame images compressed into a single frame image.

9. The method of claim 1 wherein replacing frames of the single video signal with the background images comprises interlacing the background images with the video signals encoded.

10. The method of claim 1 wherein the background images are uncompressed.

11. The method of claim 1 further comprising, prior to extracting the background images, splitting each of the plurality of video signals into a series of shorter non-overlapping video subsequences, and, second, performing the steps claim 1 on a group of corresponding ones of the shorter non-overlapping video subsequences.

12. The method claim 11 further comprising, after the splitting but prior to the extracting, determining whether the group of corresponding ones of the shorter non-overlapping video subsequences contain a background image, and, if the video subsequences contain a background image, performing the steps of claim 1 on a group of corresponding ones of the shorter non-overlapping video subsequences.

13. The method of claim 12 wherein, if the video subsequences do not contain a background image, skipping the extracting and replacing and only encodings the group of corresponding ones of the shorter non-overlapping video subsequences.

14. The method of claim 11 comprising separately performing the steps of claim 1 on each group of corresponding ones of the shorter non-overlapping video subsequences in the series to obtain a single series of shorter non-overlapping video subsequences.

15. The method of claim 14 further comprising joining the single series of shorter non-overlapping video subsequences to obtain a single video signal.

16. The method of claim 15 further comprising, prior to joining, inserting a flag at beginning and end of each one of the video subsequences in the single series of shorter non-overlapping video subsequences.

* * * * *